United States Patent [19]

Senshu et al.

[11] Patent Number: 5,170,385
[45] Date of Patent: Dec. 8, 1992

[54] RECORDING MEDIUM WITH UNEMBOSSED AREA INDICATING SECTOR DIVISIONS

[75] Inventors: Susumu Senshu; Tamotsu Yamagami, both of Kanagawa; Shigeaki Wachi; Tetsu Watanabe, both of Tokyo, all of Japan

[73] Assignee: Sony Corporation, Tokyo, Japan

[21] Appl. No.: 603,312

[22] Filed: Oct. 25, 1990

[30] Foreign Application Priority Data

Nov. 21, 1989 [JP] Japan .................................. 1-302370

[51] Int. Cl.⁵ .............................................. G11B 7/007
[52] U.S. Cl. .......................................... 369/48; 369/32; 369/109; 369/111; 369/275.3; 369/275.4
[58] Field of Search .................. 369/32, 44.26, 44.28, 369/275.3, 48, 275.1, 275.4, 109, 47, 48, 49, 50, 111; 360/59

[56] References Cited

U.S. PATENT DOCUMENTS

| 4,866,692 | 9/1989 | Saito et al. | 369/47 |
| 4,949,331 | 8/1990 | Maeda et al. | 369/275.3 |
| 5,034,934 | 7/1991 | Naito et al. | 360/59 |

FOREIGN PATENT DOCUMENTS 0242078 10/1987 European Pat. Off. .

Primary Examiner—Roy N. Envall, Jr.
Assistant Examiner—Muhammad Edun
Attorney, Agent, or Firm—Lewis H. Eslinger; Donald S. Dowden

[57] ABSTRACT

A recording medium in which one sector is divided into a plurality of segments and information is recorded in the segments, uses a reproducing method in which information is reproduced optically from this medium. The recording medium has an area in which no embossed pit is formed beforehand comprising at least one segment among a plurality of segments, and embossed pits indicative of the head of the sector which is formed in correspondence to the head position of the sector. Clocks are reproduced by detecting the pit for clock reproduction on the basis of the area in the recording medium in which no embossed pit is formed beforehand. The head position of the sector is detected by detecting whether the pit indicative of the head of the sector is present or not at a timing based on the clock. With this method, the head position of the sector can be detected correctly even if information was recorded by a modulating system in which all signal patterns can exist according to the modulating rule.

4 Claims, 5 Drawing Sheets

RECORDING MEDIUM WITH UNEMBOSSED
AREA INDICATING SECTOR DIVISIONS

BACKGROUND OF THE INVENTION

1. Field of the Invention

The present invention relates to an optical disc to record data and a reproducing method of an optical disc and, more particularly, to a recording medium and its reproducing method in which the start position of a sector can be always detected even if recording is done by a modulating system, for instance, NRZI which does not have a pattern which is impossible on a modulating rule.

2. Description of the Prior Art

In an optical disc, one track is divided into a plurality of sectors and data is recorded/reproduced on a sector unit basis. There has been proposed an optical disc in which the sector is further divided into a plurality of segments and a servo byte is provided between the segments.

In such an optical disc, hitherto, a pattern which is impossible on a modulating rule is provided in, for instance, a header in the head segment of each sector. When a desired sector is accessed, the pattern which does not exist in the modulating system is detected first.

Figure 1:
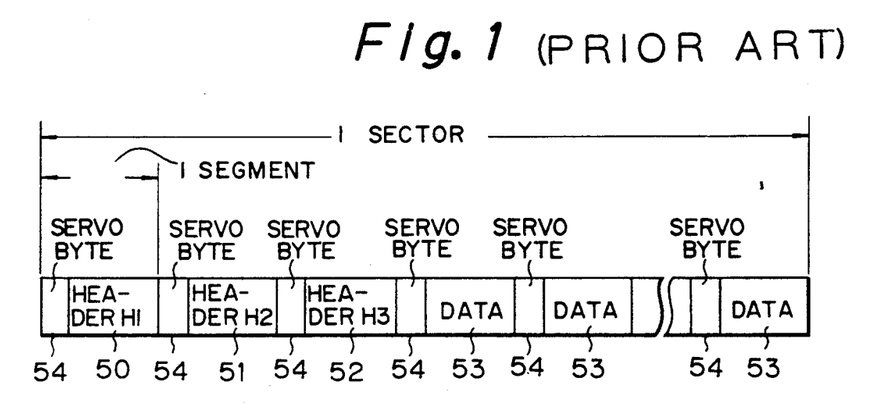
FIG. 1 is a schematic diagram showing a construction of a sector in a conventional optical disc.

That is, in such a kind of conventional optical disc, as shown in FIG. 1, one sector is divided into a plurality of segments. A head segment 50 of one sector and two segments 51 and 52 following the segment 50 are set to headers H1, H2, and H3, respectively. Segments 53 subsequent to the head H3 are set to data areas.

Figure 2:
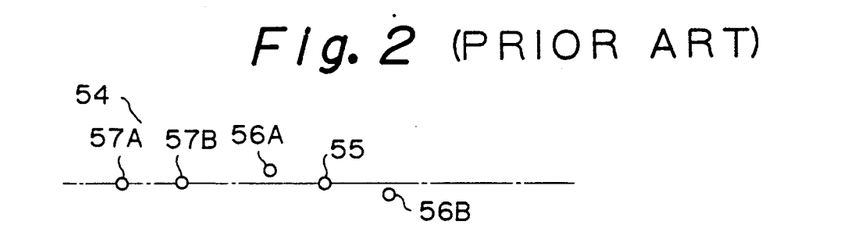
FIG. 2 is a schematic diagram showing a construction of a servo byte in a conventional optical disc.

A servo byte 54 is provided between the segments. As shown in FIG. 2, a pit 55 for clock reproduction and wobble pits 56A and 56B for tracking are arranged in the servo byte 54. In the example, pits 57A and 57B indicative of a Gray bode for track accessing are further arranged.

Figure 3:
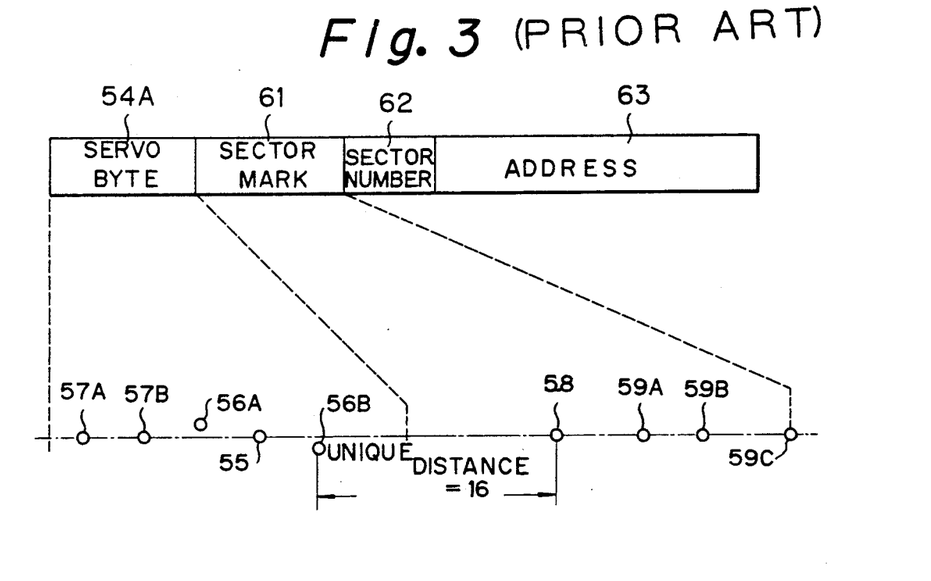
FIG. 3 is a schematic diagram showing a construction of a header in a conventional optical disc.

FIG. 3 shows a construction of the header H1 in the first segment. A servo byte 54A is arranged in the head of the header H1. A recording area 61 of a sector mark, a recording area 62 of the sector number, and a recording area 63 of an address are provided in the header H1.

As shown in FIG. 3, a pit 58 to form a unique distance which does not appear in the case of, for instance, the 4/11 modulation as disclosed in Japanese Patent Laid Open Publication No. Hei 2-130764 is provided in the sector mark recording area 61 in the header H1. That is, the pit 58 is arranged at a position which is away from the wobble pit 56B of a servo byte 54A by a distance 16. This distance forms a unique distance which does not appear in the case of, for example, the 4/11 modulation. Pits 59A to 59C are pits indicative of the sector mark.

In the case of accessing to a target sector, a pattern of the unique distance is detected first. Thus, a pattern comprising the pits 56B and 58 is detected. If this pattern can be detected, it is possible to detect that the segment is the head segment 50. Further, the pit 55 for clock reproduction is detected and the clocks can be reproduced.

The use of NRZI (Non Return to Zero Inverted) as a modulating method of an optical disc has been examined. This is because the NRZI has an advantage such that a window margin is long.

In the conventional optical disc, for instance, the 4/11 modulation is used. According to such a modulating method, a pattern which does not appear on a modulating rule exists. Therefore, as mentioned above, a pattern which does not exist in the modulating system is provided in the header H1 and when a desired sector is accessed, it is possible to execute a control such as to detect first the pattern which does not appear on the modulating rule.

On the other hand, in the NRZI modulating code, a pattern which does not appear on the modulating rule does not exist. Therefore, when a desired sector is accessed it is impossible to execute a control such as to detect the pattern which does not appear on the modulating rule.

In the case of a magnetooptical disc, if a servo byte is formed by an embossed pit as a physical pit of a different reflectance and a data area is formed by a pit of an orientation of the magnetization of a perpendicular magnetizing film, reproducing methods for the servo byte and the data area are different. Therefore, the reproduction signal of the servo byte and the reproduction signal of the data area can be discriminated.

However, in the case of the read only optical disc, since both of the servo byte and the data area are formed by embossed pits, it is difficult to discriminate the reproduction signal of the servo byte and the reproduction signal of the data area.

OBJECTS AND SUMMARY OF THE INVENTION

It is, therefore, an object of the invention to provide a recording medium in which a desired sector can be accessed even in the case of using modulating method such as NRZI in which a pattern which does not appear in the modulating system does not exist.

It is another object of the invention to provide a reproducing method which can access a desired sector even in the case of using a modulating method such as NRZI in which a pattern which does not appear in the modulating system does not exist.

According to an aspect of the invention, there is provided a recording medium for reproducing information by optical means having:

an area with no embossed pit formed beforehand therein comprising at least one segment among a plurality of segments obtained by dividing one sector; and, information indicative of the head of a sector recorded in correspondence to the head position of the sector.

According to another aspect of the invention, there is provided a data reproducing method for reproducing data from a recording medium having an area with no embossed pit formed beforehand therein comprising at least one segment among a plurality of segments obtained by dividing one sector and information indicative of the head of a sector recorded in correspondence to the head position of the sector, comprising the steps of;

detecting a segment of the recording medium in which no embossed pit is formed beforehand;

extracting pits for clock reproduction based on a segment of the recording medium in which no embossed pit is formed beforehand and reproducing clocks; and detecting the head position of a sector by detecting the presence or absence of information indicative of the head of the sector at a timing based on the clocks.

Even in the case of a ROM disc, an MO disc, or an ROM-MO mixed disc, no embossed pits exist at least in a segment of a header.

Even in the case of a ROM disc, an MO disc, or a ROM-MO mixed disc, a pit for clock reproduction and wobble pits for tracking are arranged as embossed pits in servo bytes.

Due to this, the segment having no embossed pit is detected, a pit for clock reproduction is extracted from the servo byte subsequent to the segment having no embossed pit, and the clocks can be reproduced by the PLL by using the pit for clock reproduction.

Further, a sector mark pit indicative of the head of the sector is arranged in the servo byte located at the head of the header.

Accordingly if the clock could be reproduced, by detecting whether the sector mark pit indicative of the head of the sector is included in the pattern of the servo byte, the head of the sector can be found out.

The above and other, objects features and advantages of the present invention will become readily apparent from the following detailed description thereof which is to be read in connection with the accompanying drawings.

DETAILED DESCRIPTION OF THE PREFERRED EMBODIMENTS

An embodiment of the present invention will be described referring to the drawings.

a. Description of an Example of an Optical Disc to Which the Invention Was Applied As optical discs to which the invention is applied, there are three kinds of discs having similar shapes and different characteristics. That is, there a read only disc (hereinafter, referred to as a ROM disc), a read/write disc (hereinafter, referred to as an MO disc), and a combination disc (hereinafter, referred to as an ROM-MO mixed disc) in which read only areas (hereinafter, referred to as an ROM areas) and read/wire areas (hereinafter, referred to as MO areas) mixedly exist.

All of the data is recorded in the RO disc in a form of pits (embossed pits) of different reflectances. Therefore, the ROM disc is used for only reproduction and data cannot be erased and rerecorded. The ROM disc can be used, for instance, in the case of selling data or programs.

In the MO disc, data is recorded in a form of pits of a magnetization orientation of a perpendicular magnetizing film and the data is reproduced by using a Kerr effect, that is, data is magnetooptically recorded/reproduced. Therefore, data can be erased and rerecorded. The MO disc can be used, for example in the case of recording user's data.

In the ROM-MO mixed disc, data is recorded in the ROM area in a form of embossed pit and data is recorded in the MO area in a form of pits of the magnetization orientation of a perpendicular magnetizing film. The ROM-MO mixed disc can be used, for example in the case where system programs are previously recorded in the ROM area and the MO area is set as a user's data area.

Figure 4:
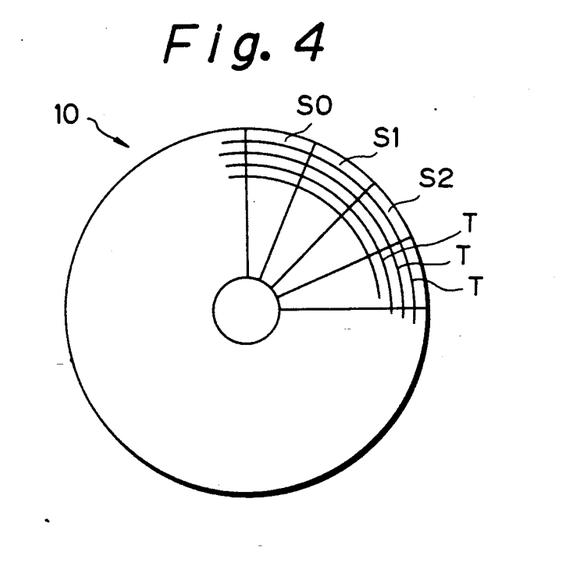
FIG. 4 is a plan view showing an outline of an example of an optical disc to which the invention was applied.

As shown in FIG. 4, tracks T are formed in those optical discs 10 (ROM disc, MO disc, ROM-MO disc). The track T is divided into a plurality of sectors S0, S1, S2, . . . and data is recorded/reproduced by using the sectors S0, S1, S1, . . . as a unit.

Figure 5:
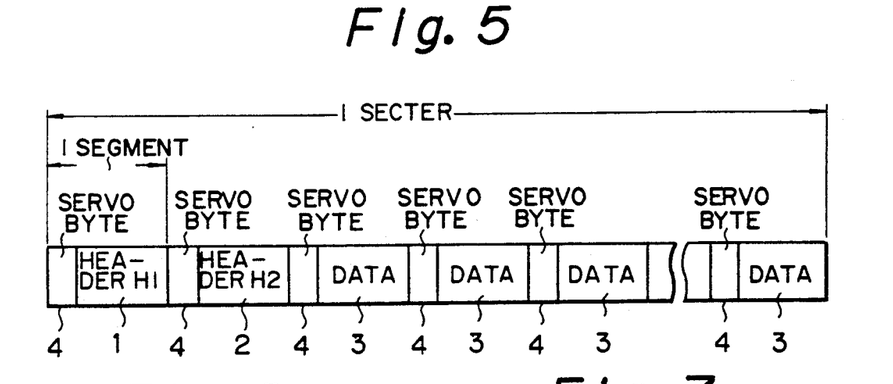
FIG. 5 is a schematic diagram showing a construction of a sector in an example of an optical disc to which the invention was applied.

Each of the sectors S0, S1, S2, . . . is further divided into a plurality of segments. As shown in FIG. 5, a segment 1 in the head of each sector is set to a header H1. Information such as sector number, address, and the like is recorded in the header H1. Even in the case of the ROM disc, MO disc, or ROM-MO mixed disc, all of the data is recorded in the segment 1 as a header H1 in a form of embossed pits.

A segment 2 subsequent to the segment 1 with header H1 is set to the header H2. The header H2 is used to, for instance, try to write data and to correct a laser power. In this invention, even in the case of the ROM disc, MO disc, or ROM-MO mixed disc, embossed pits must not be provided in the segment 2 as a header H2.

Segments 3 subsequent to the segment 2 as a header H2 are set to data areas. Data is recorded into the data areas.

In the case of the ROM disc, data is recorded in the segments 3 as data areas in a form of embossed pits.

In the case of the MO disc, data is recorded in the segments 3 as data areas in a form of pits of magnetization orientation of a perpendicular magnetizing film.

In the case of the ROM-MO mixed disc, data is recorded in the segments 3 as data areas of the ROM areas in a form of embossed pits, while data is recorded in the segments 3 as data areas of the MO areas in a form of pits of the magnetization orientation of the perpendicular magnetizing film.

Figure 6:
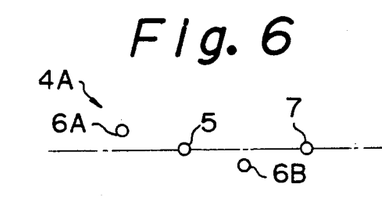
FIGS. 6 and 7 are schematic diagrams showing construction of servo bytes in examples of an optical disc to which the invention was applied.
Figure 7:
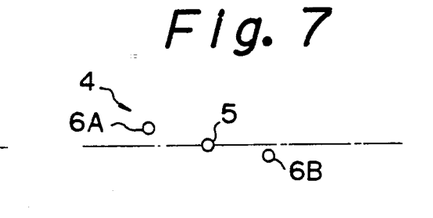

Servo bytes 4A, 4, . . . are provided between the respective segments. As shown in FIGS. 6 and 7, a pit 5 for clock reproduction and wobble pits 6A and 6B for tracking area arranged in the servo bytes 4A, 4, . . . A tracking servo is executed by signals reproduced from the wobble pits 6A and 6B. Further, as shown in FIG. 6, a sector mark pit 7 indicative of the head of the sector is arranged in the servo byte 4A locating at the head of the header H1.

Even in the case of the ROM disc, MO disc, or ROM-MO mixed disc, the pits 5 for clock reproduction, wobble pits 6A and 6B for tracking, and sector mark pits 7 existing in the servo bytes 4A, 4, . . . are formed as embossed pits.

By constructing each segment as mentioned above, even in the case of the ROM disc, MO disc, or ROM-MO mixed disc, one or more segments having no embossed pit certainly occur in one sector.

Figure 8:
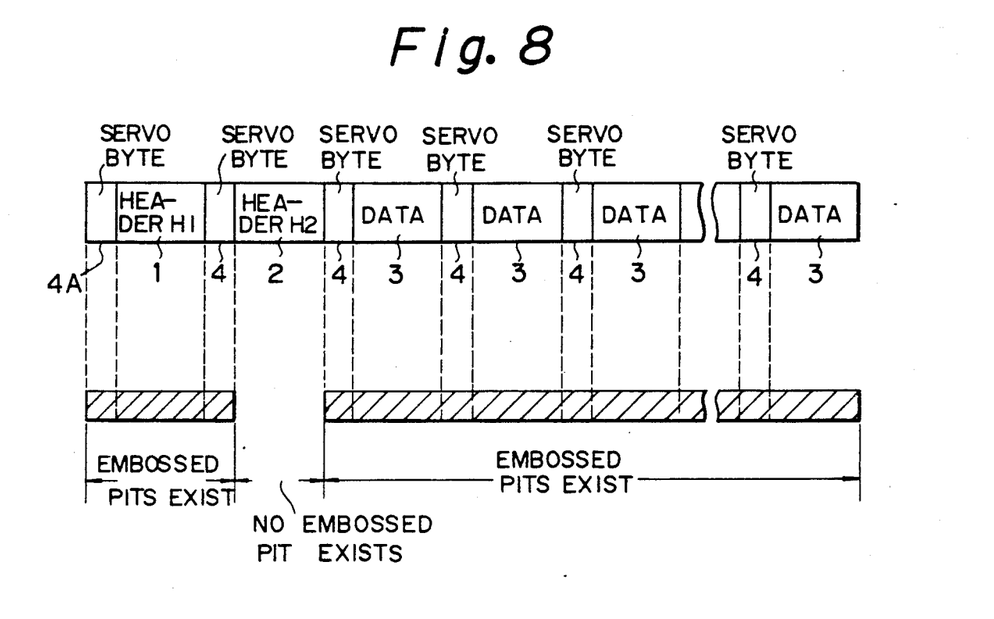
FIGS. 8 and 9 are schematic diagrams which are used for explaining examples of an optical disc to which the invention was applied.
Figure 9:
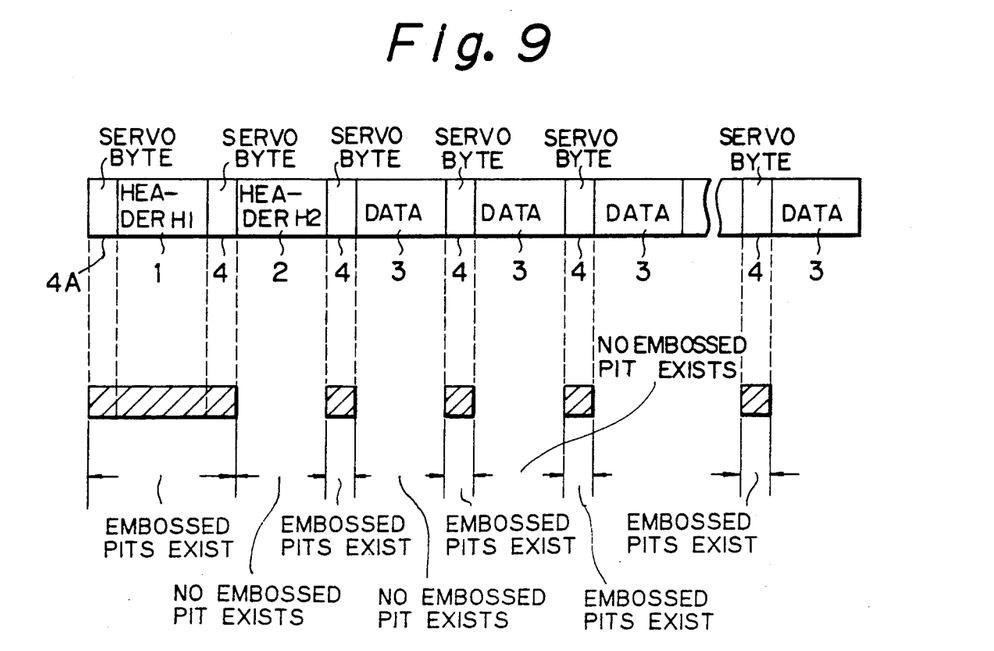

That is, in FIGS. 8 and 9, embossed pits exist in hatched regions. In the case of the ROM disc, as shown in FIG. 8, embossed pits certainly exist in the servo bytes 4A, 4, . . . and in the segment 1 of the header H1. In the case where the recording data exists, embossed pits exist in the segments 3 as data areas. No embossed pit exists in the header H2 of segment 2.

In the case of the MO disc, as shown in FIG. 9, embossed pits certainly exist in the servo bytes 4A, 4, . . . and in the segment 1 of the header H1, and no embossed pit exists in the header H2 of segment 2 or in the data areas 3 of the subsequent segments.

In the case of the ROM MO mixed disc, the segment having no embossed pit certainly exists in the ROM disc and the segment having no embossed pit also certainly exists in the MO disc, so that the segment having no embossed pit certainly exists.

As mentioned above, even in the case of the ROM disc, MO disc, or ROM-MO mixed disc, no embossed pit exists in at least the header H2 of segment 2.

Even in the case of the ROM disc, MO disc, or ROM-MO mixed disc, as shown in FIG. 7, the pit 5 for clock reproduction and the wobble pits 6A and 6B for tracking are arranged as embossed pits in the servo bytes 4.

Further, as shown in FIG. 6, together with the pit 5 for clock reproduction and the wobble pits 6A and 6B for tracking, the sector mark pit 7 indicative of the head of the sector is arranged as embossed pits in the servo byte 4A located at the head of the header H1.

Therefore, in the case of the optical disc to which the invention was applied, even if a pattern which does not exist in the modulating system is not inserted, the clock can be reproduced and the head of the sector can be accessed.

That is, in the case of accessing a desired sector; after a spindle motor was rotated and the focusing servo was completed, the segment having no embossed pit is detected.

Even in the case of the ROM disc, MO disc, or ROM-MO mixed disc, at least the segment 2 of the header H2 is set to a segment having no embossed pit. Therefore, even if any kind of optical disc is loaded, the segment having no embossed pit is certainly detected. If the segment having no embossed pit can be detected, the position of the servo byte 4 or 4A subsequent to such a segment can be found.

If the segment having no embossed pit was detected, the pit 5 for clock reproduction of the servo byte 4 or 4A subsequent to such a segment is taken out. The clock is reproduced by the PLL using the pit 5 for clock reproduction.

After the clock was reproduced, a check is made to see if the sector mark pit 7 indicative of the head of the sector is detected in the pattern of the servo byte 4 or 4A. If the sector mark pit 7 was detected, the above position is determined to be the head of the sector.

b. Description of a Disc Reproducing Apparatus to Which the Invention Was Applied FIG. 10 shows an example of an optical disc reproducing apparatus which can access the head of a desired sector as mentioned above.

Figure 10:
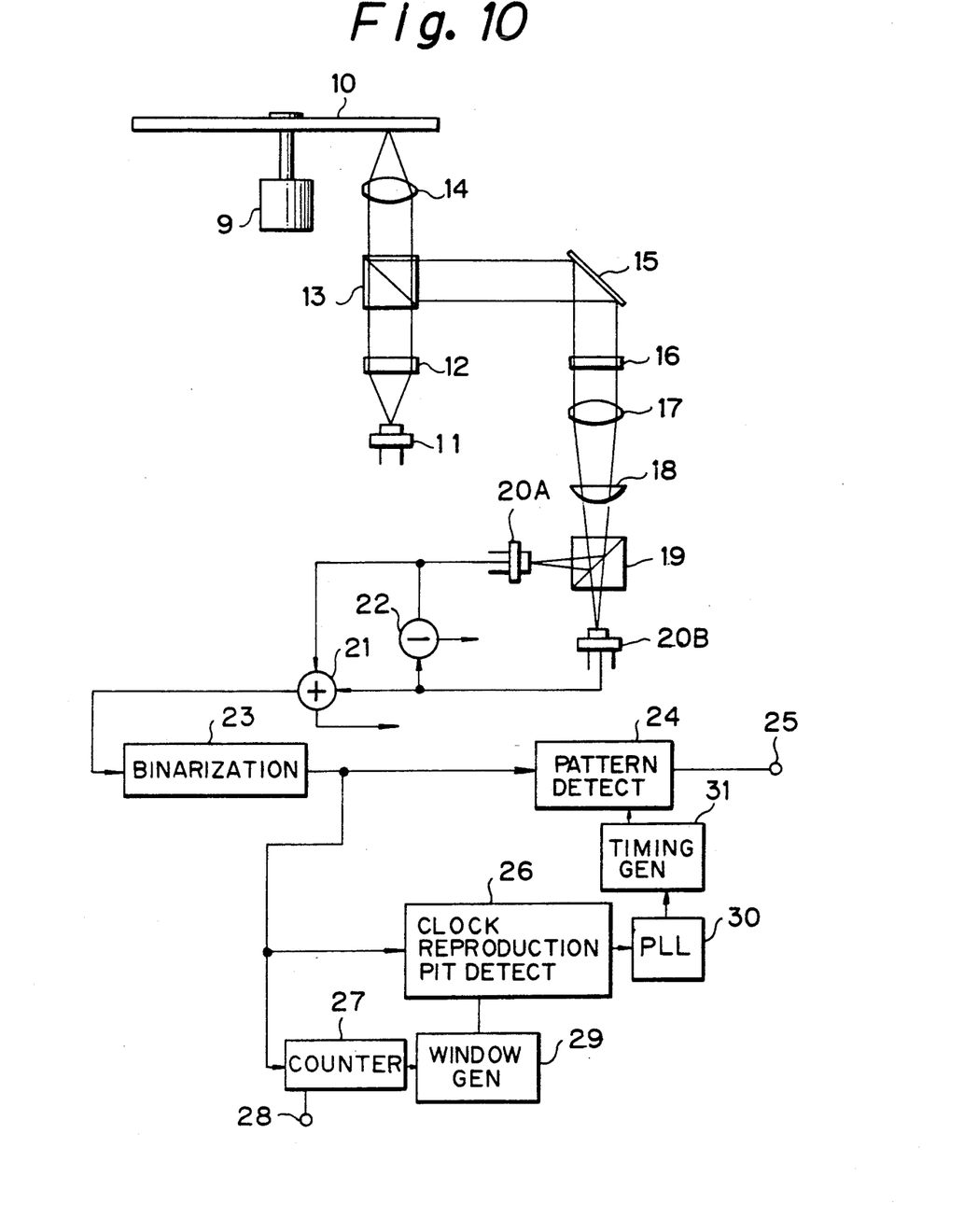
FIG. 10 is a block diagram of an example of a reproducing apparatus for reproducing an optical disc to which the invention was applied.

In FIG. 10, reference numeral 10 denotes the optical disc. As mentioned above, no embossed pit is formed in the header H2 of each sector of the optical disc 10. The sector mark pit 7 indicative of the head of the sector is arranged in the servo byte 4A located at the head of the header H1 as mentioned above. The optical disc 10 is rotated by a spindle motor 9.

Reference numeral 11 denotes a laser diode. A laser beam which is irradiated from the laser diode 11 is converted into a parallel light beam through a collimating lens 12 and is converged onto the optical disc 10 through a beam splitter 13 and an objective lens 14.

The reflected light of the optical disc 10 is reflected by a mirror 15 through the objective lens 14 and beam splitter 13. The light is transmitted through the half wavelength plate 16, a condenser lens 17, a cylindrical lens 18, and a deflecting beam splitter 19 and is received by photo diodes 20A and 20B.

Outputs of the photo diodes 20A and 20B are supplied to an adding circuit 21 and to a subtracting circuit 22. A reproduction signal of the embossed pit formed on the optical disc 10 is derived from an output of the adding circuit 21. On the other hand, a reproduction signal of the pit of the magnetization orientation of the perpendicular magnetizing film formed on the optical disc 10 can be obtained from an output of the subtracting circuit 22.

The output of the adding circuit 21 is supplied to a binarizing circuit 23. In the binarizing circuit 23, the reproduction signal of the embossed pit which was reproduced from the optical disc 10 is binarized.

The output of the binarizing circuit 23 is supplied to a pattern detecting circuit 24 and to a clock reproduction pit detecting circuit 26. An output of the binarizing circuit 23 is supplied to a reset terminal of a counter 27. A count clock is supplied from a terminal 28 to the counter 27.

The counter 27 detects the segment having no embossed pit.

That is, when the portion having no embossed pit is reproduced, no output appears from the binarizing circuit 23. During the period the output of the binarizing circuit 23 does not appear, the counter 27 counts count clocks from the terminal 28.

When the portion having an embossed pit is reproduced, the output appears from the binarizing circuit 23. When the output appears from the binarizing circuit 23, the counter 27 is reset.

In the case of the reproduction signal of the segment having embossed pits, since the output appears from the binarizing circuit 23, the counter 27 is reset before the count value reaches a predetermined value.

In the case of the reproduction signal of the segment having no embossed pit, the count clocks are counted by the counter 27 until a predetermined value. A signal indicating that the segment having no embossed pit was detected is output from the counter 27.

A window generating circuit 29 forms a gate signal to extract the reproduction signal of the pit 5 (refer to FIGS. 6 and 7) for clock reproduction of the servo byte 4 or 4A subsequent to such a segment on the basis of the output from the counter 27. The gate signal is supplied to a clock reproduction pit detecting circuit 26.

The reproduction signal of the clock reproduction pit 5 of the subsequent servo byte 4 or 4A is extracted in the clock reproduction pit detecting circuit 26 at a timing of a gate signal from the window generating circuit 29. The reproduction signal of the pit 5 for clock reproduction is supplied to a PLL 30.

In the PLL 30, the clock is reproduced from the reproduction signal of the pit 5 for clock reproduction. If the clock can be reproduced, a synchronization can be achieved on a segment unit basis. The reproduced clock is supplied from the PLL 30 to a timing generating circuit 31.

On the basis of the clock from the PLL 30, the timing generating circuit 31 outputs a timing signal corresponding to the servo byte 4 or 4A of each segment. The timing signal is supplied to the pattern detecting circuit 24.

The pattern detecting circuit 24 detects whether the sector mark pit 7 (refer to FIG. 6) indicative of the head of the sector is included in the pattern of the reproduction signal at the position corresponding to the servo byte 4 or 4A of each segment. In the case where the pattern of the reproduction signal at the position corresponding to the servo byte 4 or 4A is a pattern including the sector mark pit 7, the servo byte can be determined to be the servo byte 4A of the head segment 1.

Figure 11:
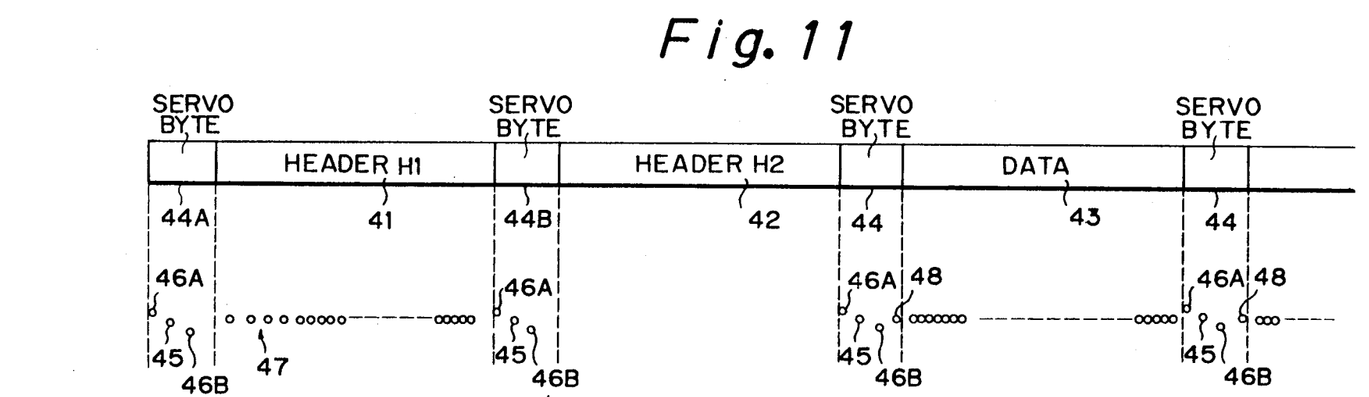
FIGS. 11 and 12 are schematic diagrams which are used for explanation of other examples of an optical disc to which the invention was applied.

If the sector mark pit 7 is included in the pattern of the reproduction signal at the position corresponding to the servo byte 4 or 4A, a sector start position trigger signal is output from an output terminal 25.

c. Description of Another Example of an Optical Disc to Which the Invention Was Applied FIGS. 11 and 12 show other example of an optical disc to which the invention was applied.

Figure 12:
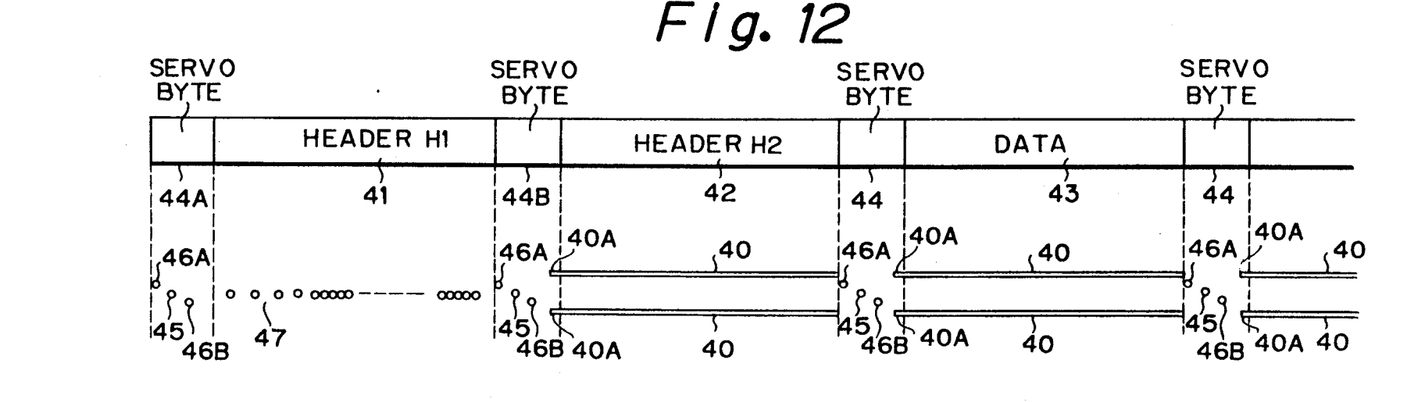

As shown in FIG. 12, there has been proposed a method whereby side grooves 40 are provided in a segment 42 of the header H2 in the MO area and in segments 43 in the data area, so that the influence from the data area of an adjacent track is eliminated.

To protect the first data in the header H2 and the data area, the side groove 40 is arranged in a manner such that a start edge 40A of the side groove 40 overlaps an end edge of a servo byte 44 or 44B just before the side groove 40.

As mentioned above, if the side groove 40 is arranged in a manner such that the start edge 40A overlaps the end edge of the servo byte 44 or 44B just before the side groove 40, the reproduction signal when passing through the side groove 40 appears upon seeking. Therefore, as mentioned above, if the sector mark pit is arranged in the end edge of the head servo byte of the sector, the reproduction signal of the start edge 40A of the side groove 40 which overlaps the end edge of the servo byte 44 or 44B just before the side groove 40 and the reproduction signal of the sector mark pit cannot be distinguished.

On the other hand, in the above embodiment, the segment having no embossed pit is detected for a period of time corresponding to one segment and the servo byte subsequent to the segment having no embossed pit is detected, thereby reproducing the clock. However, if the reproduction signal appears from the header H2 due to a defect or noises, the segment having no embossed pit is detected for a period of time corresponding to one segment as mentioned above and the clock cannot be reproduced.

Therefore, in the embodiment, as shown in FIG. 11, in the case of the ROM disc or the ROM area of the ROM MO mixed disc, ROM marks 48 are arranged in the end edges of the servo bytes 44 other than the servo bytes 44A and 44B just before the headers H1 and H2. Address information is recorded in the header H1 by, for instance, a Gray code or a 4/11 modulation. In FIG. 11, a pit 47 is a pit indicative of the address information.

In the case of the embodiment, the pattern of the servo byte is detected first by a crystal clock or the like. A check is made to see if a pattern of the next servo byte is not detected until the lapse of a time interval of one segment and the pattern of the next servo byte is detected after the lapse of a time interval of one segment or not. If the patterns of the servo byte could be detected and, after the time interval of one segment, the pattern of the next servo byte could be detected, it is determined that the servo byte could be detected.

Due to this, even if the same pattern as the pattern of the servo byte exists in the ROM disc or the ROM area of the ROM-MO mixed disc, it is not erroneously detected as a servo byte. This is because in the case where the same pattern as the pattern of the servo byte exists in the ROM disc or the data area of the ROM area of the ROM MO mixed disc, a correct servo byte can be detected during the time interval of one segment from this point.

On the other hand, due to this, even if a defect or noises occurred in the header H2, the clock can be reproduced. This is because even if the reproduction signal appears from the header H2, the reproduction signal does not exhibit the same pattern as the pattern of the servo byte.

If the servo byte could be detected as mentioned above, a check is made to see whether the reproduction signals of the start edge 40A of the groove 40 or the ROM marks 48 are detected in the end edge of the servo byte 44. A check is then made to see if the segment is a segment in which the pattern of the pit 47 indicative of the address information can be detected or not.

If the reproduction signal of the start edge 40A of the groove 40 or the ROM marks 48 is not detected and the pattern of the pit 47 indicative of the address information was detected, it is determined that the segment is the head of the sector.

As mentioned above, according to the invention, regardless of the kind of optical disc, at least one or more segments having no embossed pit exist. Therefore, the segment having no embossed pits is detected, the pit 5 for clock reproduction is taken out of the servo byte 4 subsequent to the segment having no embossed pit, and the clock can be reproduced by the PLL using the pit 5 for clock reproduction.

The sector mark pit 7 indicative of the head of the sector is arranged in the servo byte 4A located at the head of the header H1. Due to this, if the clock could be reproduced, by detecting whether the sector mark pit 7 indicative of the head of the sector is included in the pattern of the servo byte 4, the head of the sector can be found.

What is claimed is:

1. A recording medium for reproducing information by optical means having:
   a track divided into a plurality of sectors and each sector divided into a plurality of segments;
   at least one of said plurality of segments having an area forming a portion thereof with no embossed pit formed therein beforehand, said area with no embossed pit for use in identifying a beginning of a sector; and
   information indicative of the head of a sector recorded in one of said plurality of segments at the head position of said sector, said one at the head position being ahead of and adjacent said one of said plurality of segments with no embossed pit;
   each of said segments comprising a servo byte including at least one embossed clock pit;
   each of said plurality of segments other than said at least one of said plurality of segments including a data area in which data is recorded beforehand; and said information indicative of the head of said sector is formed beforehand in said servo byte in the head segment of said plurality of segments of said sector.

2. A data reproducing method for reproducing data from a recording medium having a plurality of tracks, each track divided into a plurality of sectors, and each sector divided into a plurality of segments, in which one of said plurality segments has an area with no embossed pits formed therein beforehand, each of said plurality of segments having a servo byte containing a clock pit and in which header information indicative of the head of a sector is recorded in one of said segments at the head of said sector, the one of said plurality of segments having an area with no embossed pits being located with a predetermined relationship relative to the segment having the header information, comprising the steps of:

- detecting a said segment of said recording medium having a portion in which no embossed pit is formed beforehand;
- extracting said clock pits from the servo bytes in subsequent ones of said plurality of segments based on a clock of the servo byte in the detected one of said plurality of segments in which no embossed pit is formed beforehand and reproducing clocks using the extracted pits; and
- detecting the head position of a sector by detecting the presence of information indicative of the head of said sector at a timing based on said reproduced clocks.

3. A data reproducing method according to claim 2, wherein said segment of said recording medium in which no embossed pit is formed beforehand is detected by counting clock pulses during a time when no embossed pit is detected.

4. A recording medium for reproducing information by optical means having;
- a track divided into a plurality of sectors and each sector divided into a plurality of segments, one of said segments containing information indicating the head of a sector;
- at least one of said plurality of segments having an area forming a portion thereof with no embossed pit formed therein beforehand, said area with no embossed pit for use in locating said segment indicating the head of a sector;
- each of said segments comprises a servo byte including at least one embossed clock pit;
- each of said segments other than said at least one of said plurality of segments having an area with no embossed pit including a data area in which data is to be subsequently recorded.

* * * * *